United States Patent
Samad et al.

(10) Patent No.: US 10,146,471 B1
(45) Date of Patent: Dec. 4, 2018

(54) OFFLOADED DATA PROTECTION BASED ON VIRTUAL MACHINE SNAPSHOTS

(71) Applicant: EMC Corporation, Hopkinton, MA (US)

(72) Inventors: Mohammed Abdul Samad, Bangalore (IN); Shelesh Chopra, Bangalore (IN); Vladimir Mandic, San Jose, CA (US)

(73) Assignee: EMC CORPORATION, Hopkinton, MA (US)

( * ) Notice: Subject to any disclaimer, the term of this patent is extended or adjusted under 35 U.S.C. 154(b) by 107 days.

(21) Appl. No.: 15/193,339

(22) Filed: Jun. 27, 2016

(51) Int. Cl.
   *G06F 12/00* (2006.01)
   *G06F 3/06* (2006.01)

(52) U.S. Cl.
   CPC ............ *G06F 3/065* (2013.01); *G06F 3/0619* (2013.01); *G06F 3/0664* (2013.01); *G06F 3/0683* (2013.01)

(58) Field of Classification Search
   CPC ...... G06F 3/065; G06F 3/0619; G06F 3/0664; G06F 3/0683
   See application file for complete search history.

(56) References Cited

U.S. PATENT DOCUMENTS

| | | | |
|---|---|---|---|
| 8,566,542 B1* | 10/2013 | Wang | G06F 11/1456 711/114 |
| 2007/0244938 A1* | 10/2007 | Michael | G06F 11/1458 |

\* cited by examiner

*Primary Examiner* — Kalpit Parikh
(74) *Attorney, Agent, or Firm* — Dergosits & Noah LLP; Todd A. Noah (57) ABSTRACT

Offloaded data protection based on virtual machine snapshots is described. A system identifies a virtual machine associated with a backup application. The system identifies a storage identifier associated with a virtual machine storage management tool and the virtual machine. The system creates a snapshot of the virtual machine and an identifier of the snapshot by prompting a storage array, which is associated with the virtual machine storage management tool, with the storage identifier. The system mounts the snapshot to a proxy server. The system creates a backup based on the snapshot by prompting the backup application with the identifier of the snapshot.

20 Claims, 3 Drawing Sheets

OFFLOADED DATA PROTECTION BASED ON VIRTUAL MACHINE SNAPSHOTS

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object. A backup/restore application may create a full backup file that includes all of a data object or the parts of the data object that are used. A backup/restore application may also create an incremental backup file that includes only changes made to the data object since a selected time, such as a previous backup of the data object.

An image, such as a snapshot, is a capture of a state of a data object, such as a file system, a virtual machine, or an application, at a specific moment in time. A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create images of data objects and store the images of data objects on multiple storage arrays.

A virtual machine is a software implementation of a computer that executes programs like a physical machine. A system virtual machine provides a complete system platform which supports the execution of a complete operating system, and usually emulates an existing architecture, including disks. Multiple instances of virtual machines lead to more efficient use of computing resources, both in terms of energy consumption and cost effectiveness, known as hardware virtualization, the key to a cloud computing environment. Similar to other data objects, backup copies may be made of virtual machine data objects to enable a restoration of the virtual machine data objects in the event of corruption or an erroneous update to the virtual machine data objects.

Server virtualization has proven to be a highly effective technology in many enterprises, and is a key element enabling cloud and information technology as a service offerings. Storage technology has been an area of increased focus as server virtualization has expanded, due to the impact server virtualization has on data access patterns of applications. Some enterprises have consolidated information technology roles and responsibilities, as utilizing information technology generalists, such as hypervisor-centric information technology administrators, may be more efficient. Virtual machine management tools are expanding to encompass more of the information technology infrastructure to improve the efficiency and effectiveness of information technology generalists.

An example of a virtual machine management tool is VASA (vSphere APIs for Storage Awareness), which is a virtual machine storage management tool that is available from VMware® and that enables Virtual Volumes (VVOLs), which is an integration and management framework for external storage such as storage area networks (SAN) and network-attached storage (NAS). This Virtual Volumes framework allows customers to easily assign and manage storage capabilities on a per-virtual machine basis at the hypervisor level using storage policy-based management. The Virtual Volumes storage architecture represents a significant change in the way hypervisors utilize and interact with storage systems. The VASA virtual machine storage management tool utilizes the unique capabilities of each underlying storage system, as presented through the VASA interface. This VASA interface enables virtual machine administrators and non-storage information technology administrators to have visibility into storage system quality of service features, such as RAID levels and drive type, and to leverage the storage systems data protection features including snapshots. With direct virtual machine to storage device mapping, the Virtual Volumes framework provide fine grain controls for data protection and I/O performance analysis. The storage and data services can be applied on a per virtual machine disk level as opposed to a data store level. The data services provided by storage vendors can be easily leveraged now rather than leveraging the services developed and maintained by virtual machine management tools.

Storage policy-based management enables the capturing of storage service levels requirements such as capacity, performance, availability, and data protection, in the form of logical templates, or policies, to which virtual machines are associated. Storage policy-based management automates storage provisioning by identifying available data stores that meet policy requirements and, when coupled with the Virtual Volumes framework, dynamically instantiates the necessary data services. Through policy enforcement, storage policy-based management also automates service-level monitoring and compliance throughout the lifecycle of a virtual machine.

DETAILED DESCRIPTION

The following example uses the Virtual Volumes framework as the software-defined storage model where virtual machine workloads are running, but the same concept can be extended to any similar storage model that exists. An enterprise may use a storage area network or network-attached storage to satisfy the enterprise's existing virtual machine storage needs, and use traditional backup protection for these virtual machines by implementing backup policies based on schedule, retention, cloning, replication, etc. for these virtual machines in a backup application. The enterprise may determine that the enterprise's storage vendor supports the Virtual Volumes framework, and decide to implement the Virtual Volumes framework. Then the enterprise's storage administrator may create the desired capability profiles in a storage array. The enterprise's virtual machine administrator may create the required virtual machine storage policies via a virtual machine center tool so that the underlying vendor-specific capabilities of the storage array get exposed through the VASA virtual machine storage management tool to the enterprise's virtual machine administrator, and assign the desired storage policies to virtual machines, which enables the virtual machines to seamlessly consume the published capabilities. Then the compliant storage may become available for the virtual machine administrator during provisioning virtual machines to the Virtual Volumes framework, thereby providing the virtual machine administrator with better manageability of the underlying storage resources for any virtual machines running on the Virtual Volumes framework. Since the enterprise has been running traditional backup protection, the enterprise may prefer to continue using the same workflow for some or all of the virtual machines due to compliance and regulatory reasons and/or due to the requirement of extended retention. The backup application may follow a workflow of creating a snapshot of a virtual machine, mounting the virtual machine's snapshot to a proxy server, and then creating a backup file for the virtual machine. However, creating backups has a significant impact on the production environment's central processing units and storage. Furthermore, a virtual machine has to run on a read-only snapshot of the virtual machine, while saving all writes for the virtual machine to a log, until the backup is completed.

Embodiments herein enable offloaded data protection based on virtual machine snapshots. A system identifies a virtual machine associated with a backup application. The system identifies a storage identifier associated with a virtual machine storage management tool and the virtual machine. The system creates a snapshot of the virtual machine and an identifier of the snapshot by prompting a storage array, which is associated with the virtual machine storage management tool, with the storage identifier. The system mounts the snapshot to a proxy server. The system creates a backup based on the snapshot by prompting the backup application with the identifier of the snapshot.

For example, an offloading tool retrieves a list of virtual machines, which includes virtual machine 1, from an Avamar® backup application. The offloading tool accesses a web services interface executing on a virtual machine center server to identify a storage identifier SIDvm1, for virtual machine 1, which was created for use by a VASA virtual machine storage management tool. The offloading tool creates a replica snapshot of virtual machine 1 and the SSvm1 identifier of the replica snapshot by providing the storage identifier SIDvm1 for virtual machine 1 to a storage array's application programming interface associated with the VASA virtual machine storage management tool. The offloading tool adds the storage array as a data store to a proxy server that is attached to a proxy virtual machine center tool which has the VASA virtual machine storage management tool enabled and online, the VASA virtual machine storage management tool recognizes the replica snapshot, and the offloading tool mounts the replica snapshot to the proxy server. The offloading tool creates a backup based on the replica snapshot by prompting the Avamar® backup application with the identifier SSvm1 of the replica snapshot. By leveraging virtual machine snapshots enabled by the Virtual Volumes framework, the offloading tool minimizes the impact on the production environment during the creation of the backups of virtual machines using the traditional workflow.

Figure 1:
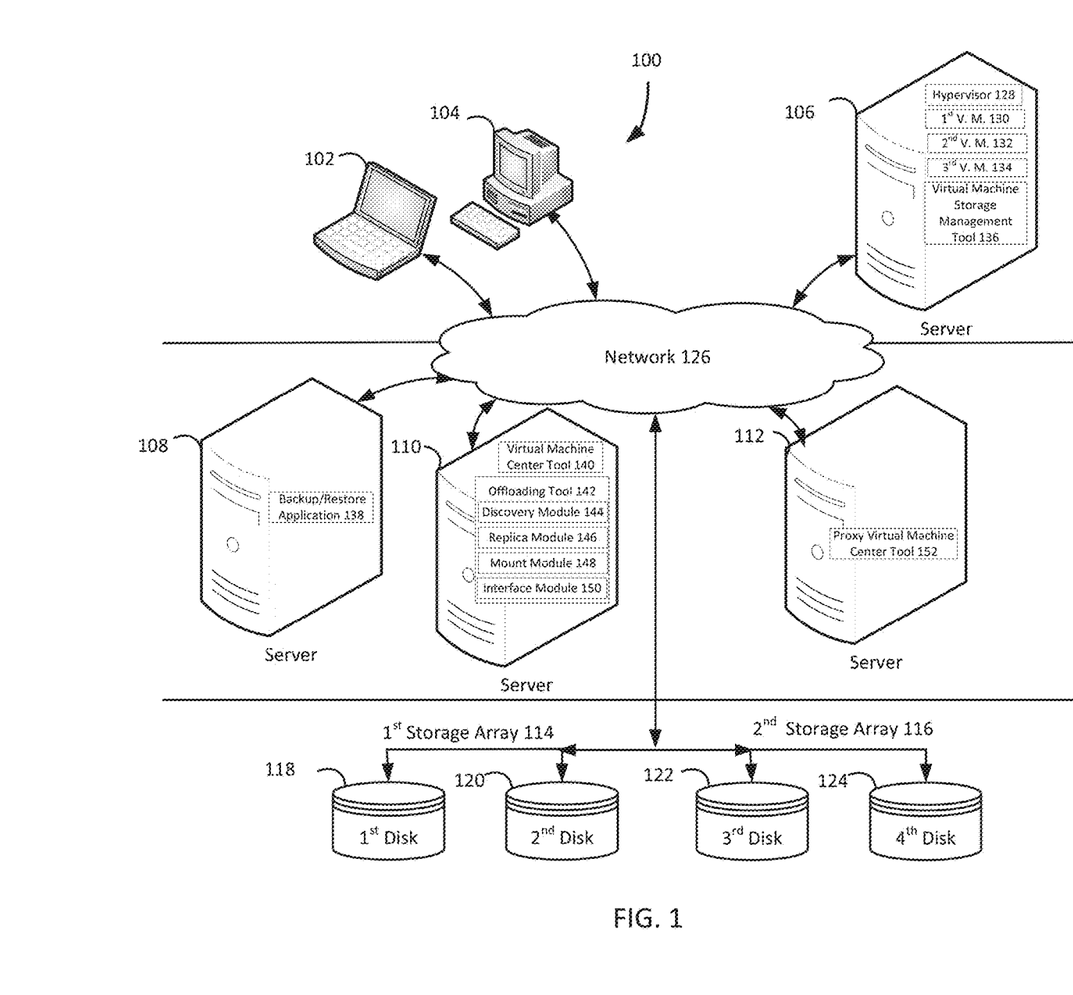
FIG. 1 illustrates a block diagram of an example system for offloaded data protection based on virtual machine snapshots, under an embodiment.

FIG. 1 illustrates a diagram of a system for offloaded data protection based on virtual machine snapshots, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a first server 108, a second server 110, and a third server 112, a first storage array 114, and a second storage array 116 that may be provided by a hosting company. Although FIG. 1 depicts the first client 102 as a laptop computer 102, the second client 104 as a personal computer 104, and the third client 106 as a server 106, each of the clients 102-106 may be any type of computer. The first storage array 114 includes a first disk 118 and a second disk 120, and the second storage array 116 includes a third disk 122 and a fourth disk 124. Although examples describe the first storage array 114 storing backups based on backup policies, and the second storage array 116 storing snapshots based on storage policies, one storage array may store both backups based on backup policies and snapshots based on storage policies. The clients 102-106, the servers 108-112, and the storage arrays 114-116 communicate via a network 126. Although FIG. 1 depicts the system 100 with three clients 102-106, three servers 108-112, two storage arrays 114-116, four disks 118-124, and one network 126, the system 100 may include any number of clients 102-106, any number of servers 108-112, any number of storage arrays 114-116, any number of disks 118-124, and any number of networks 126. The clients 102-106 and the servers 108-112 may each be substantially similar to the system 300 depicted in FIG. 3 and described below.

The third client 106 includes a hypervisor 128, which may be a Microsoft Hyper-V® hypervisor. The hypervisor 128 creates and monitors a first virtual machine 130, a second virtual machine 132, and a third virtual machine 134 in the third client 106. The third client 106 also includes a virtual machine storage management tool 136, such as the VASA virtual machine storage management tool 136 that is available from VMware®. Although FIG. 1 depicts the third client 106 as including the hypervisor 128, the first virtual machine 130, the second virtual machine 132, the third virtual machine 134, and the virtual machine storage management tool 136, any of the clients 102-106 or all of the clients 102-106 may include a hypervisor, any number of virtual machines, and a virtual machine storage management tool.

The server 108, which may be referred to as the backup server 108, includes a backup/restore application 138 that creates backup files of the data and the metadata of the clients 102-106, stores the backup files on the first disk 118 and/or the second disk 120, and executes a rollback based on the backup files. The backup/restore application 138 may provide centralized administration, such as scheduling, monitoring, and managing backup operations and backup files. The backup/restore application 138 can enable the storing of backup operation schedules, client policies, and client configurations. The backup/restore application 138 maintains a local database of all processes that execute on the backup server 108. The backup/restore application 138 executes server-side processes for a system administrator's graphical management console, which may enable the system administrator to use command line interface tools for queries. For example, a system administrator identifies the clients 102-106 registered with the backup server 108.

Although FIG. 1 depicts the backup/restore application 138 residing completely on the backup server 108, the backup/restore application 138 may reside in any combination of partially on the backup server 108, partially on the clients 102-106, and/or partially elsewhere. Even though the following paragraphs describe EMC Corporation's Avamar® backup/restore application and EMC Corporation's NetWorker® backup/restore application as examples of the backup/restore application 138, the backup/restore application 138 may be any other backup/restore application which provides the backup/restore functionalities described in the Background section.

The backup/restore application 138 may be an EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 138 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The second server 110, which may be referred to as the virtual machine center server 110, includes and executes a virtual machine center tool 140 to provide a centralized and extensible platform for managing virtual infrastructure. This managing of virtual machine environments enables administrators to have simple and automated control over a virtual environment to deliver infrastructure. The virtual machine center server 110 provides centralized management of virtualized hosts and virtual machines from a single console, and gives administrators visibility into the configuration of all the critical components of a virtual infrastructure, all from one place. With the virtual machine center server 110, virtual environments are easier to manage, as a single administrator can manage hundreds of workloads, more than doubling typical productivity in managing physical infrastructure.

The virtual machine center server 110 also includes an offloading tool 142 that enables offloaded data protection based on virtual machine snapshots. The offloading tool 142 may include a discovery module 144, a replica module 146, a mount module 148, and an interface module 150. While FIG. 1 depicts the offloading tool 142 as including the modules 144-150, each of the modules 144-150 may be divided into smaller modules and/or combined together with other modules. Although FIG. 1 depicts the offloading tool 142 residing completely on the virtual machine center server 110, the offloading tool 142 may reside in any combination of partially on the virtual machine center server 110, partially on the clients 102-106, and/or partially elsewhere. Similarly, although FIG. 1 depicts the modules 144-150 residing completely on the virtual machine center server 110, any combination of any part of the modules 144-150 may reside in any combination of partially on the virtual machine center server 110, partially on the clients 102-106, and/or partially elsewhere.

The third server 112, which may be referred to as the proxy server 112, includes and executes a proxy virtual machine center tool 152, which is substantially similar to the virtual machine center tool 140. Although FIG. 1 depicts the proxy virtual machine center tool 152 residing completely on the proxy server 112, any combination of any part of the proxy virtual machine center tool 152 may reside in any combination of partially on the proxy server 112 and/or partially elsewhere.

After an enterprise's storage administrator creates the desired capability profiles in the $2^{nd}$ storage array 116, the enterprise's virtual machine administrator creates the required virtual machine storage policies via the virtual machine center tool 140 so that the underlying vendor-specific capabilities of the $2^{nd}$ storage array 116 get exposed through the VASA virtual machine storage management tool 136 to the enterprise's virtual machine administrator, who assigns the desired storage policies to virtual machines, which enables the virtual machines to seamlessly consume the published capabilities. In preparation for using the traditional workflow to back up a set of one or more virtual machines, the offloading tool 142 identifies a virtual machine associated with a backup application. For example, the discovery module 144 retrieves a list of virtual machines that are backed up by the Avamar® backup application 138, including the $1^{st}$ virtual machine 130, from the Avamar® backup application 138. Having identified a set of virtual machines that are to be backed up by a backup application, the offloading tool 142 identifies a storage identifier associated with a virtual machine storage management tool and the set of virtual machines. For example, the discovery module 144 accesses a web services interface executing on the virtual machine center server 110 to identify storage identifiers for the set of virtual machines, such as the $1^{st}$ virtual machine 130's storage identifier SIDvm1 that was created for use by the VASA virtual machine storage management tool 136.

After identifying storage identifiers for a set of virtual machines associated with a virtual machine storage management tool, the offloading tool 142 creates a snapshot of a virtual machine and an identifier of the snapshot by prompting a storage array, which is associated with the virtual machine storage management tool, with the storage identifier. For example, the replica module 146 creates a replica snapshot of the $1^{st}$ virtual machine 130 by providing the storage identifier SIDvm1 for the $1^{st}$ virtual machine 130 to the second storage array 116's application programming interface associated with the VASA virtual machine storage management tool 136. Continuing this example, the replica module 146 requests a list of the corresponding unique identifiers for each of the replica snapshots, such the SSvm1 identifier of the replica snapshot for the $1^{st}$ virtual machine 130. A replica snapshot is an unmanaged snapshot from the perspective of a virtual machine storage management tool because such a snapshot is not created based on any storage policy associated with the virtual machine storage management tool.

Having created a snapshot of a virtual machine, the offloading tool 142 can identify a proxy server and a proxy virtual machine center tool from a database for a backup application. For example, the mount module 148 retrieves the internet protocol and the login credentials for the proxy server 112 and the proxy virtual machine center tool 152 from a database used by the Avamar® backup application 138. Although this example describes a backup application database as storing the internet protocol and the login credentials for a proxy server and a proxy virtual machine center tool, the internet protocol and the login credentials for a proxy server and a proxy virtual machine center tool may be stored elsewhere. After creating a snapshot of a virtual machine, the offloading tool 142 mounts the snapshot to a proxy server. For example, the mount module 148 adds the second storage array 116 as a data store to the proxy server 112 that is attached to the proxy virtual machine center tool 152 which has the VASA virtual machine storage management tool 136 enabled and online. After the VASA virtual machine storage management tool 136 and the proxy virtual machine center tool 152 recognize the replica snapshot for the $1^{st}$ virtual machine 130 that is stored by the second storage array 116, the mount module 148 mounts the replica snapshot for the $1^{st}$ virtual machine 130 to the proxy server 112.

Having mounted a snapshot to a proxy server, the offloading tool 142 creates a backup based on the snapshot by prompting a backup application with the identifier of the snapshot. For example, the interface module 150 creates a backup based on the replica snapshot for the $1^{st}$ virtual machine 130 by prompting the Avamar® backup application 138 with the identifier SSvm1 of the replica snapshot for the $1^{st}$ virtual machine 130. Having created a backup based on a snapshot mounted to a proxy server, the offloading tool 142 can unmount the snapshot from the proxy server. For example, the interface module 150 instructs the mount module 148 to unmount the replica snapshot of the $1^{st}$ virtual machine 130 from the proxy server 112 because this replica snapshot no longer needs to be mounted. Having created a backup based on a snapshot mounted to a proxy server, the offloading tool 142 can delete a snapshot from a storage array. For example, the interface module 150 instructs the replica module 146 to delete the replica snapshot of the $1^{st}$ virtual machine 130 from the second storage array 116 because this replica snapshot no longer needs to be stored, which the replica module 146 does via the second storage array 116's application programming interface. By leveraging virtual machine snapshots enabled by the Virtual Volumes framework, the offloading tool 142 minimizes the impact on the production server 106 during the creation of the backups of the virtual machines 130-134 using the traditional workflow.

Figure 2:
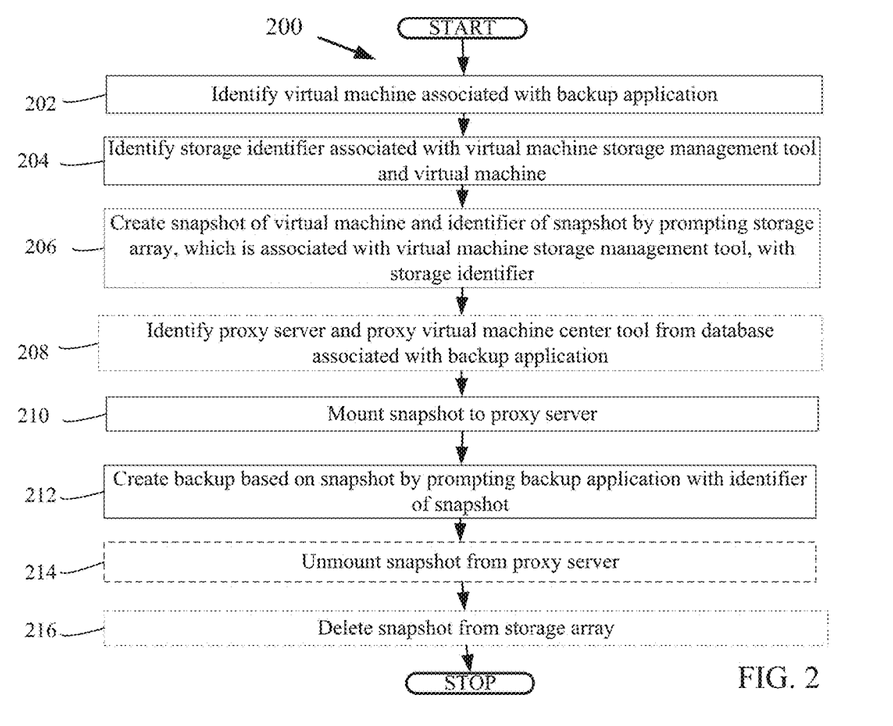
FIG. 2 is a flowchart that illustrates a method of offloaded data protection based on virtual machine snapshots, under an embodiment.

FIG. 2 is a flowchart that illustrates a method for offloaded data protection based on virtual machine snapshots, under an embodiment. Flowchart 200 illustrates method acts illustrated as flowchart blocks for certain steps involved in and/or between the clients 102-106 and/or the servers 108-112 of FIG. 1.

The system 100 identifies a virtual machine associated with a backup application, block 202. For example, the offloading tool 142 retrieves a list of virtual machines, which includes the $1^{st}$ virtual machine 130, from the Avamar® backup application 138.

Having identified a virtual machine, the system 100 identifies a storage identifier associated with a virtual machine storage management tool and the virtual machine, block 204. For example, the offloading tool 142 accesses a web services interface executing on the virtual machine center server 110 to identify a storage identifier SIDvm1, for the $1^{st}$ virtual machine 130, which was created for use by the VASA virtual machine storage management tool 136.

After identifying a storage identifier for a virtual machine associated with a virtual machine storage management tool, the system 100 creates a snapshot of the virtual machine and an identifier of the snapshot by prompting a storage array, which is associated with the virtual machine storage management tool, with the storage identifier, block 206. For example, the offloading tool 142 creates a replica snapshot of the $1^{st}$ virtual machine 130 and the SSvm1 identifier of the replica snapshot by providing the storage identifier SIDvm1 for the $1^{st}$ virtual machine 130 to the second storage array 116's application programming interface associated with the VASA virtual machine storage management tool 136.

Having created a snapshot of a virtual machine, the system 100 optionally identifies a proxy server and a proxy virtual machine center tool from a database associated with a backup application, block 208. For example, the offloading tool 142 identifies the proxy server 112 and the proxy virtual machine center tool 152 from a database used by the Avamar® backup application 138.

After creating a snapshot of a virtual machine, the system 100 mounts the snapshot to a proxy server, block 210. For example, the offloading tool 142 adds the second storage array 116 as a data store to the proxy server 112 that is attached to the proxy virtual machine center tool 152 which has the VASA virtual machine storage management tool 136 enabled and online, the VASA virtual machine storage management tool 136 recognizes the replica snapshot for the $1^{st}$ virtual machine 130, and the offloading tool 142 mounts the replica snapshot for the $1^{st}$ virtual machine 130 to the proxy server 112.

Having mounted a snapshot to a proxy server, the system 100 creates a backup based on the snapshot by prompting a backup application with the identifier of the snapshot, block 212. For example, the offloading tool 142 creates a backup based on the replica snapshot for the $1^{st}$ virtual machine 130 by prompting the Avamar® backup application 138 with the identifier SSvm1 of the replica snapshot for the $1^{st}$ virtual machine 130.

Having created a backup based on a snapshot mounted to a proxy server, the system 100 optionally unmounts the snapshot from the proxy server, block 214. For example, the offloading tool 142 unmounts the replica snapshot of the 1$^{st}$ virtual machine 130 from the proxy server 112.

Having created a backup based on a snapshot mounted to a proxy server, the system 100 optionally deletes a snapshot from a storage array, block 216. For example, the offloading tool 142 deletes the replica snapshot of the 1$^{st}$ virtual machine 130 from the second storage array 116.

Although FIG. 2 depicts the blocks 202-216 occurring in a specific order, the blocks 202-216 may occur in another order. In other implementations, each of the blocks 202-216 may also be executed in combination with other blocks and/or some blocks may be divided into a different set of blocks.

Figure 3:
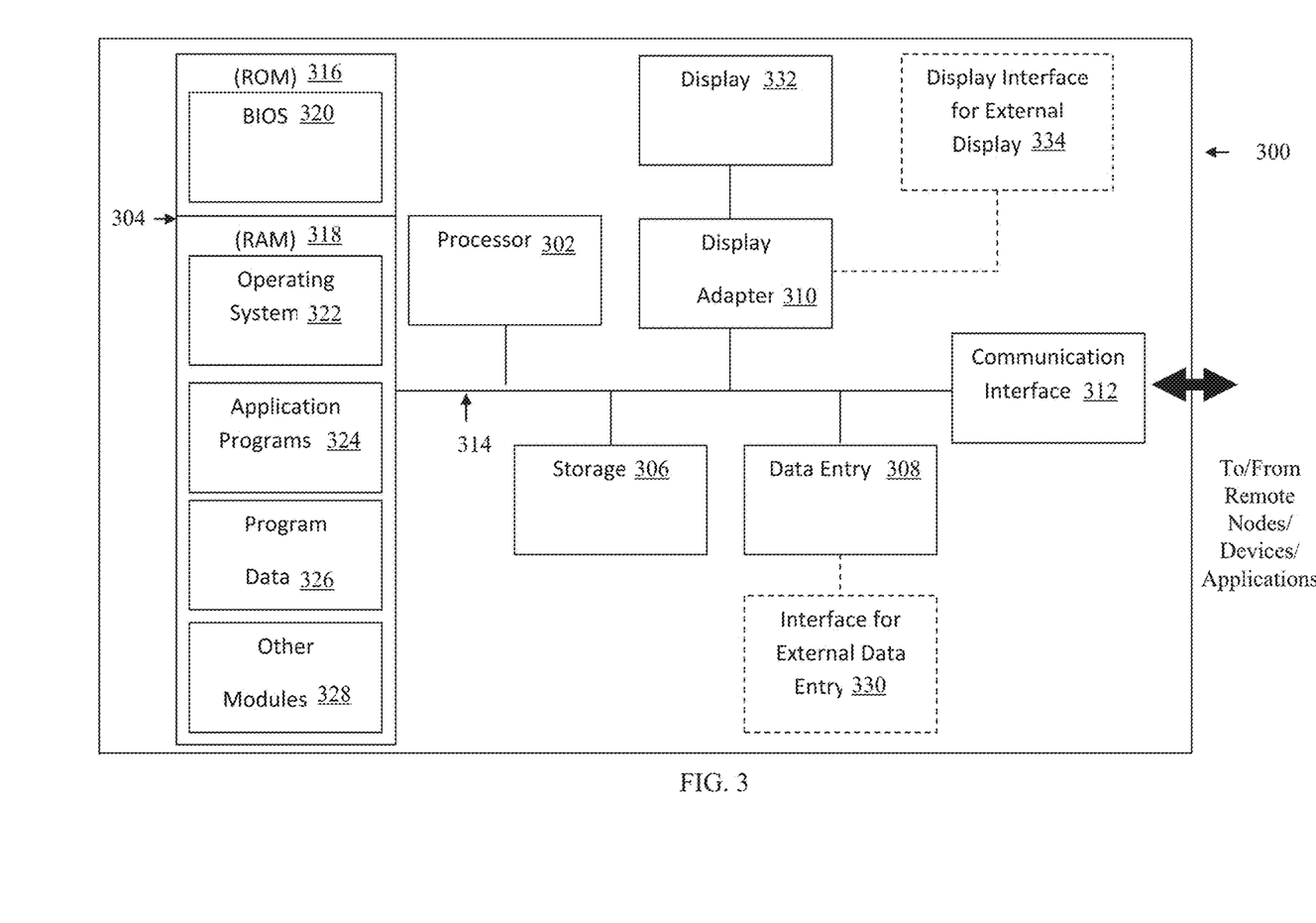
FIG. 3 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for offloaded data protection based on virtual machine snapshots, the system comprising:
   a processor; and
   a processor-based application, which when executed on a computer, will cause the processor to:
      identify a virtual machine associated with a backup application;
      identify a storage identifier associated with a virtual machine storage management tool and the virtual machine;
      create a snapshot of the virtual machine and an identifier of the snapshot by prompting a storage array, which is associated with the virtual machine storage management tool, with the storage identifier;
      mount the snapshot to a proxy server; and
      create a backup based on the snapshot by prompting the backup application with the identifier of the snapshot.

2. The system of claim 1, wherein the processor-based application further causes the processor to identify the proxy server and a proxy virtual machine center tool from a database associated with the backup application.

3. The system of claim 1, wherein the virtual machine storage management tool is attached to a proxy virtual machine center tool.

4. The system of claim 1, wherein mounting the snapshot to the proxy server comprises adding the storage array as a data store to the proxy server, and the virtual machine storage management tool recognizing the snapshot.

5. The system of claim 1, wherein the proxy server is attached to a proxy virtual machine center tool.

6. The system of claim 1, wherein the processor-based application further causes the processor to unmount the snapshot from the proxy server.

7. The system of claim 1, wherein the processor-based application further causes the processor to delete the snapshot from the storage array.

8. A computer-implemented method for offloaded data protection based on virtual machine snapshots, the method comprising:

identifying a virtual machine associated with a backup application;

identifying a storage identifier associated with a virtual machine storage management tool and the virtual machine;

creating a snapshot of the virtual machine and an identifier of the snapshot by prompting a storage array, which is associated with the virtual machine storage management tool, with the storage identifier;

mounting the snapshot to a proxy server; and creating a backup based on the snapshot by prompting the backup application with the identifier of the snapshot.

9. The method of claim 8, wherein the method further comprises identifying the proxy server and a proxy virtual machine center tool from a database associated with the backup application.

10. The method of claim 8, wherein the virtual machine storage management tool is attached to a proxy virtual machine center tool.

11. The method of claim 8, wherein mounting the snapshot to the proxy server comprises adding the storage array as a data store to the proxy server, and the virtual machine storage management tool recognizing the snapshot.

12. The method of claim 8, wherein the proxy server is attached to a proxy virtual machine center tool.

13. The method of claim 8, wherein the method further comprises unmounting the snapshot from the proxy server.

14. The method of claim 8, wherein the method further comprises deleting the snapshot from the storage array.

15. A computer program product, comprising a non-transitory computer-readable medium having a computer-readable program code embodied therein to be executed by one or more processors, the program code including instructions to:

identify a virtual machine associated with a backup application;

identify a storage identifier associated with a virtual machine storage management tool and the virtual machine;

create a snapshot of the virtual machine and an identifier of the snapshot by prompting a storage array, which is associated with the virtual machine storage management tool, with the storage identifier;

mount the snapshot to a proxy server; and create a backup based on the snapshot by prompting the backup application with the identifier of the snapshot.

16. The computer program product of claim 15, wherein the program code includes further instructions to identify the proxy server and a proxy virtual machine center tool from a database associated with the backup application.

17. The computer program product of claim 15, wherein the virtual machine storage management tool is attached to a proxy virtual machine center tool.

18. The computer program product of claim 15, wherein mounting the snapshot to the proxy server comprises adding the storage array as a data store to the proxy server, and the virtual machine storage management tool recognizing the snapshot.

19. The computer program product of claim 15, wherein the proxy server is attached to a proxy virtual machine center tool.

20. The computer program product of claim 15, wherein the program code includes further instructions to:

unmount the snapshot from the proxy server; and delete the snapshot from the storage array.

* * * * *